Aug. 21, 1945.  H. M. DODGE  2,382,963
WINDSHIELD OR WINDOW CONSTRUCTION
Filed Jan. 10, 1942   2 Sheets-Sheet 1

Inventor
HENRY M. DODGE
By Frank Fraser
Attorney

Aug. 21, 1945.　　　　H. M. DODGE　　　　2,382,963
WINDSHIELD OR WINDOW CONSTRUCTION
Filed Jan. 10, 1942　　　2 Sheets-Sheet 2
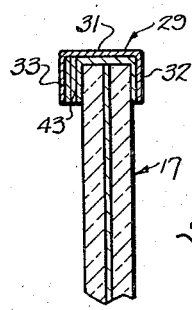
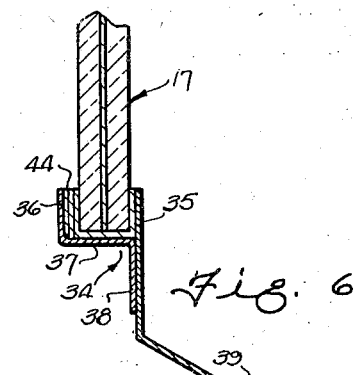
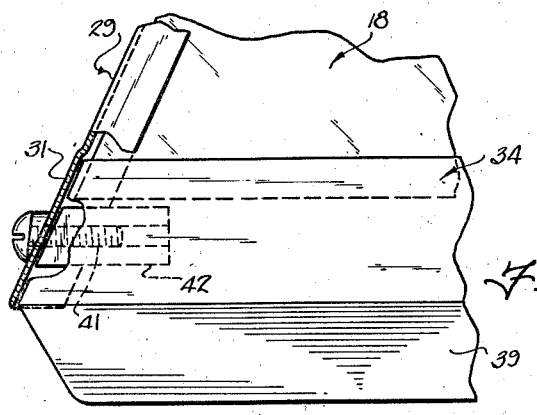
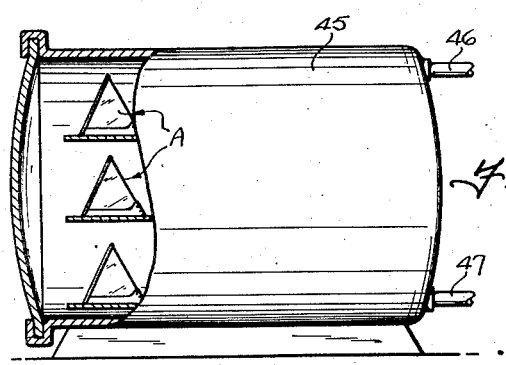
Inventor
HENRY M. DODGE.
By Frank Fraser
Attorney Patented Aug. 21, 1945

2,382,963

UNITED STATES PATENT OFFICE 2,382,963

WINDSHIELD OR WINDOW CONSTRUCTION

Henry M. Dodge, Perrysburg, Ohio, assignor to Libbey-Owens-Ford Glass Company, Toledo, Ohio, a corporation of Ohio Application January 10, 1942, Serial No. 426,333

2 Claims. (Cl. 189—64)

The present invention relates to windshield and/or window constructions particularly adapted for use in airplanes and other aircraft although not restricted thereto.

An object of the invention is the provision of an improved type of windshield or window embodying two or more sheets or plates of glass arranged in edge to edge relation and disposed either in the same plane or at an angle with respect to one another.

Another object of the invention is the provision of an improved windshield or window of the above character, in which the glass sheets or plates are associated with one another in such a manner that obstruction to vision is reduced to a minimum.

A further object of the invention is the provision of an improved windshield or window of the above character, in which the glass sheets or plates are mounted in a metal supporting frame in such a way that the said sheets or plates will be "cushioned" against mechanical vibration, shocks, torsional stresses, etc. of the plane when in flight, thereby reducing or eliminating the tendency of cracking or shattering of the glass from such causes.

A still further object of the invention is the provision of an improved windshield or window of the above character, in which the glass sheets or plates are associated with one another and with the metal supporting frame to provide an integral unit construction and characterized by the fact that the glass and metal will be permitted to expand and contract relative to on another without resulting in breakage of the glass or loosening of the said sheets or plates in the supporting frame.

Other objects and advantages of the invention will become more apparent during the course of the following description, when taken in connection with the accompanying drawings.

In the drawings, wherein like numerals are employed to designate like parts throughout the same:

Figure 2:
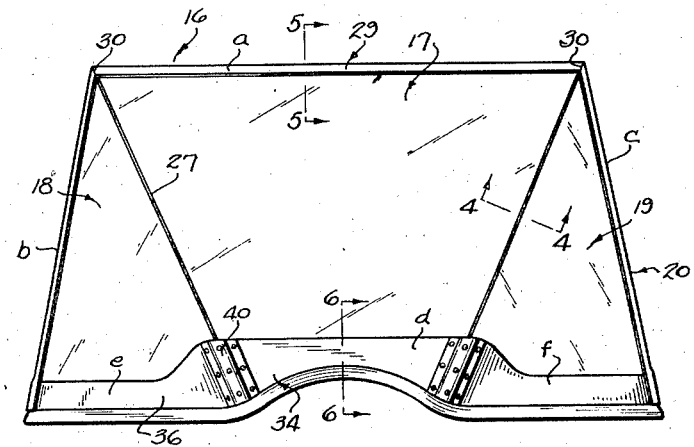
Fig. 2 is a front view of an improved windshield provided by the invention.
Figures 3, 4:
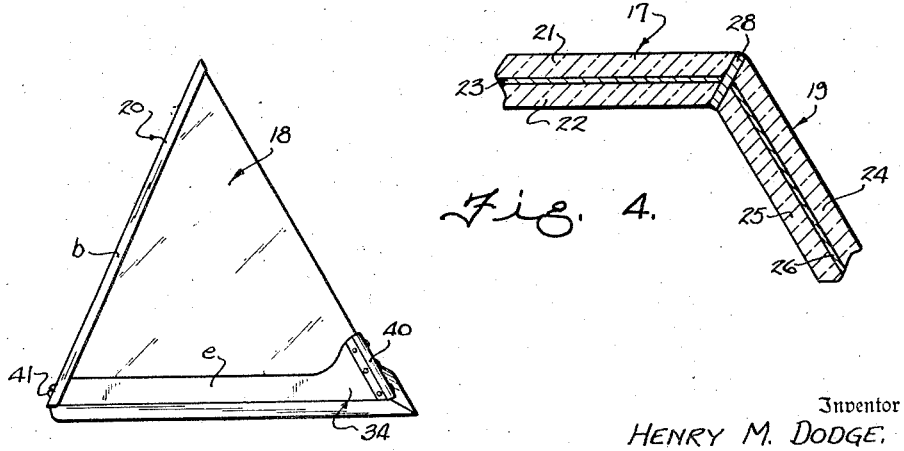
Fig. 3 is a side view thereof.
Fig. 4 is a detail horizontal section taken substantially on line 4—4 of Fig. 2.

Figs. 5 and 6 are detail vertical sections taken respectively on lines 5—5 and 6—6 of Fig. 2;

Fig. 7 is an enlarged detail view of one corner of the windshield, partially in section; and Fig. 8 is a diagrammatic representation of an autoclave, partially in section, in which the windshield may be fabricated.

Figure 1:
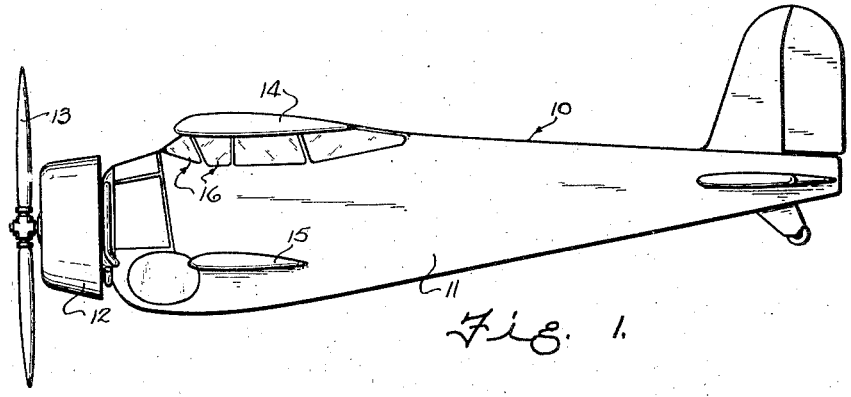
Fig. 1 is a side elevation of one type of airplane with which the present invention may be used.

With reference to the drawings and particularly to Fig. 1, there is shown an airplane 10 of the type having fuselage 11 with a forwardly located engine 12 and propeller 13. The plane is also provided with upper and lower wings 14 and 15 respectively and a cockpit having the transparent closures 16 which substantially completely enclose the pilot and enable him to have a wide sphere of vision. The transparent closures 16 include the windshield which is located in front of the pilot and the windows arranged along opposite sides of the plane. It will of course be appreciated that the airplane herein disclosed is simply one type of plane with which the present invention may be used and that the invention is adapted for use in aircraft of all kinds.

In Figs. 2 to 7 is disclosed a transparent closure 16 constituting the windshield of the plane and composed of three transparent panels 17, 18 and 19 mounted in a metal supporting frame 20. The transparent panel 17 constitutes the front or central panel of the windshield and the transparent panels 18 and 19 the side panels or wings which are disposed in edge to edge relation with the central panel and extend rearwardly and outwardly at an angle with respect thereto. The central panel 17 preferably consists of a sheet of laminated safety glass including the two sheets of glass 21 and 22 and an interposed layer of plastic material 23 adherent thereto. Each of the side panels 18 and 19 also comprises a sheet of laminated safety glass including the two sheets of glass 24 and 25 and interposed adherent layer of plastic material 26.

The glass sheets 21—22 and 24—25 may be either fully tempered or semi-tempered or may consist of ordinary plate or window glass. Likewise, any desired combination of glass sheets may be employed. Each plastic interlayer 23 and 26 preferably comprises a sheet of synthetic resin material, such as polyvinyl acetal resin. By way of example only, the plastic interlayers may be formed of polyvinyl butyr acetal resin plasticized with approximately 37½ parts dibutyl sebacate per 100 parts of resin by weight. However, different plastics varying in thickness and physical characteristics may be employed and the invention is not limited to any particular resin, class of resins, cellulosic derivatives or the like.

For the purpose of reducing obstruction of vision to a minimum as well as for securing the meeting edges of adjacent panels 17, 18 and 19 to one another, there is arranged between the vertical edges of panels 17 and 18 a strip of transparent plastic material 27, while a similar strip of transparent plastic material 28 is disposed between the vertical edges of panels 17 and 19. The strips 27 and 28 may be formed of a plastic material similar to that used for the plastic interlayers of the transparent panels 17, 18 and 19 or any other suitable plastic may be employed. The plastic strips are adapted to firmly adhere to the peripheral edges of the glass sheets of adjoining panels as well as to the exposed edges of the plastic interlayers thereof, as will be more fully hereinafter described. The adjacent vertical edges of the transparent panels may or may not be ground and polished as desired.

The metal supporting frame 20 is of channel formation and is adapted to fit around the outer edge portions of the transparent panels. More particularly, the metal frame includes a channel 29 having a central portion $a$ fitting over the upper edge of central panel 17 and depending end portions $b$ and $c$ fitting over the outer edges of the side panels 18 and 19 respectively. The channel 29 may be formed of a single length of metal bent to the proper shape, or the portions $a$, $b$ and $c$ thereof may be formed of separate strips welded or otherwise suitably secured together at the two upper corners of the windshield, as indicated at 30. As best shown in Fig. 5, the channel 29 comprises a bottom wall 31 disposed opposite the peripheral edges of the transparent panels and inwardly directed side walls 32 and 33 which overlap the marginal face portions of said panels.

The supporting frame 20 also comprises a channel 34 arranged along the bottom of the windshield and including a central portion $d$ fitting over the bottom edge of the central panel 17 and side portions $e$ and $f$ fitting over the bottom edges of the side panels 18 and 19 respectively. The channel 34 comprises an inner member 35 and an outer member 36 having portions disposed opposite the inner and outer faces of the panels. Formed integral with the outer member 36 is a horizontal portion 37 disposed opposite the peripheral edges of the panels and constituting the bottom wall of the channel, said horizontal portion terminating in an outwardly directed flange 38 secured in any suitable manner to the inner member 35. Carried by or formed integral with the inner member 35 is a depending angular skirt 39 forming an attaching portion by which the windshield may be secured in place. The outer member 36 may be formed of a single length of material or of a plurality of separate pieces secured together by bracket plates or the like 40.

The opposite end portions of the channel 28 are secured to the opposite ends of channel 34 in any desired manner such as by means of screws or the like 41 which pass through the bottom wall 31 of channel 29 and are threaded within a block 42 welded or otherwise suitably secured to the flange 38 of member 36.

As best shown in Figs. 5 and 6, the channels 29 and 34 are relatively wider than the transparent panels and inserted within the channels 29 and 34, in surrounding relation to the marginal portions of the panels, are layers of plastic material 43 and 44 respectively. In other words, the layers of plastic material completely surround the edges of the panels and engage not only the marginal faces thereof, but also their peripheral edges. The plastic material 43 and 44 may be the same as that used for the strips 27 and 28 between the edges of adjacent panels or of some other suitable type of plastic.

In fabricating the windshield, the transparent panels 17, 18 and 19 are first properly associated with one another and the strips of plastic material 27 and 28 placed between and in contact with the adjacent edges of adjoining panels. The channels 29 and 34 of the metal frame 20 are then fitted around the outer edges of the panels and the channel 29 secured to channel 34 by the screws 41. Upon tightening of the screws 41, the edges of the panels will be held tightly against the strips of plastic 27 and 28 and, at the same time, the outer edges of the panels will be pressed firmly against the layers of plastic material 43 and 44 within the channels 29 and 34.

One or any suitable number of assembled windshields indicated by the letter A are then adapted to be placed in an autoclave 45 illustrated diagrammatically in Fig. 8. This autoclave may be heated in any desired manner and is provided with inlet and outlet connections 46 and 47 for the introduction of air or a suitable pressing fluid and the exhausting of the same therefrom. Upon being placed in the autoclave, the windshield assemblies A are subjected to heat and pressure sufficient to cause a softening of the strips of plastic material 27 and 28 and the bonding of them to the edges of the panels. The plastic strips will be caused to adhere not only to the edges of the glass sheets but also to the plastic interlayers whereby to firmly secure the panels together at their meeting vertical edges. Simultaneously, the layers of plastic 43 and 44 within the channels 29 and 34 will also be softened and will be caused to adhere both to the panels and to the metal channels to provide an integral unit construction. In some cases, it may be necessary to subject the windshield assembly to heat only.

Due to the provision of the transparent plastic strips 27 and 28 obstruction to vision will be reduced to a minimum and so-called "blind spots" attending the use of the customary vertical posts or bars will be eliminated. The layers of plastic material 43 and 44 within channels 29 and 34 form, in effect, yielding or pliable gaskets around the marginal portions of the panels which are received in the metal channels and serve to "cushion" the panels against mechanical vibration, shocks, torsional stresses, etc. of the plane when in flight, thereby reducing or eliminating the tendency of cracking or shattering of the glass from such causes. Likewise, due to the provision of the plastic gaskets 43 and 44, the glass panels and metal frame will be permitted to expand and contract relative to one another without resulting in breakage of the glass or loosening of the sheets or plates in the metal frame.

The invention is of course not limited to a windshield embodying the particular arrangement of transparent panels herein disclosed or to the particular type of supporting frame therefor. On the other hand, the invention is applicable to a wide variety of windshields and/or windows including two or more sheets or plates of glass arranged either in the same plane or at an angle with respect to one another as well as to different types of supporting frames therefor.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of producing an integral transparent closure unit, comprising assembling a plurality of transparent panels in edge to edge relation with a layer of plastic material between the adjacent edges of the panels, arranging a frame around the periphery of said assembled panels with a plastic material disposed between the periphery of the panels and said frame, and then applying pressure and heat to bond said panels and frame together into a composite structure.

2. The method of producing an integral transparent closure unit, comprising assembling a plurality of transparent panels in edge to edge relation with a layer of plastic material between the adjacent edges of the panels, arranging a frame around the periphery of said assembled panels with a plastic material disposed between the periphery of the panels and said frame, and then applying heat to bond said panels and frame together into a composite structure.

HENRY M. DODGE.